United States Patent [19]

Murdock

[11] 4,047,703
[45] Sept. 13, 1977

[54] LINE RAIL CONSTRUCTION

[75] Inventor: Robert H. Murdock, Kensington, Calif.

[73] Assignee: NEF Systems, Richmond, Calif.

[21] Appl. No.: 695,827

[22] Filed: June 14, 1976

[51] Int. Cl.$^2$ .......................................... E04H 17/00
[52] U.S. Cl. .................................... 256/68; 403/244; 403/263
[58] Field of Search ...................... 256/68, 65, 22, 21, 256/59; 403/244, 253, 263

[56] References Cited

U.S. PATENT DOCUMENTS

| | | | |
|---|---|---|---|
| 2,669,434 | 2/1954 | White | 256/59 |
| 3,195,864 | 7/1965 | Case | 256/65 |
| 3,858,850 | 1/1975 | Maxcy | 256/22 |
| 3,879,017 | 4/1975 | Maxcy | 256/22 X |

Primary Examiner—Andrew V. Kundrat
Attorney, Agent, or Firm—Harris Zimmerman

[57] ABSTRACT

A rattle-free rail construction includes a plurality of vertical line posts, each having an H cross-sectional configuration defining vertical channels in the post. Each channel includes a pair of opposed, vertically extending arcuate grooves which are of the correct diameter to properly accept self-tapping screws. Another pair of opposed, vertically extending retention grooves are disposed in each channel, parallel and adjacent to the arcuate grooves. Horizontal bars of the railing construction are secured with the ends thereof in opposed channels of adjacent line posts, the bars being spaced apart in each channel by post inserts which snappingly engage the retention grooves in the channel. Double-sided foam tape is applied to the top and bottom ends of the horizontal bars, and the entire assembly is secured in a channel by joining a top subrail onto top of post by means of screws received into the top openings of the arcuate grooves.

7 Claims, 7 Drawing Figures

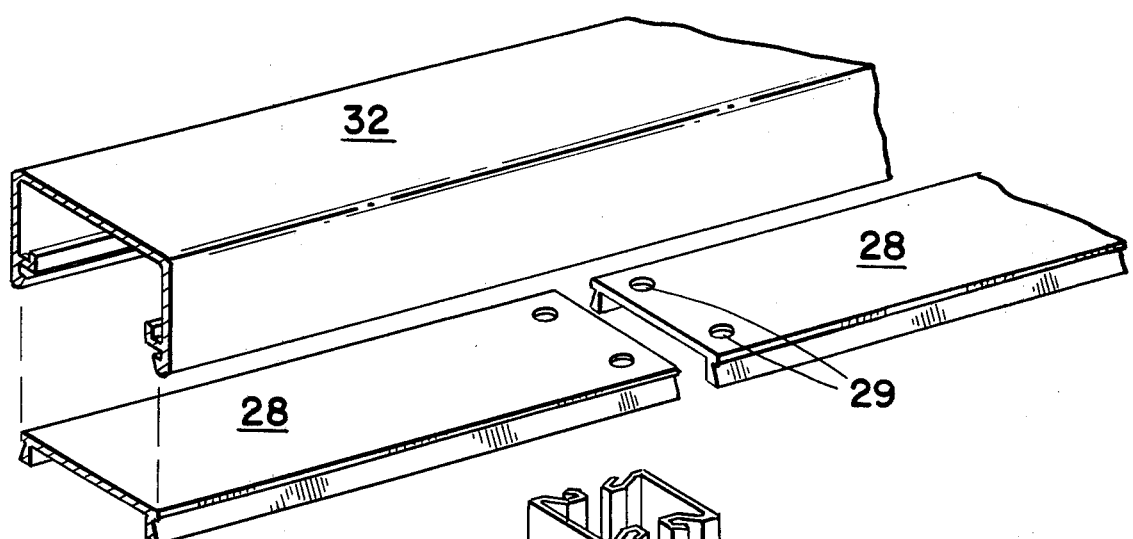
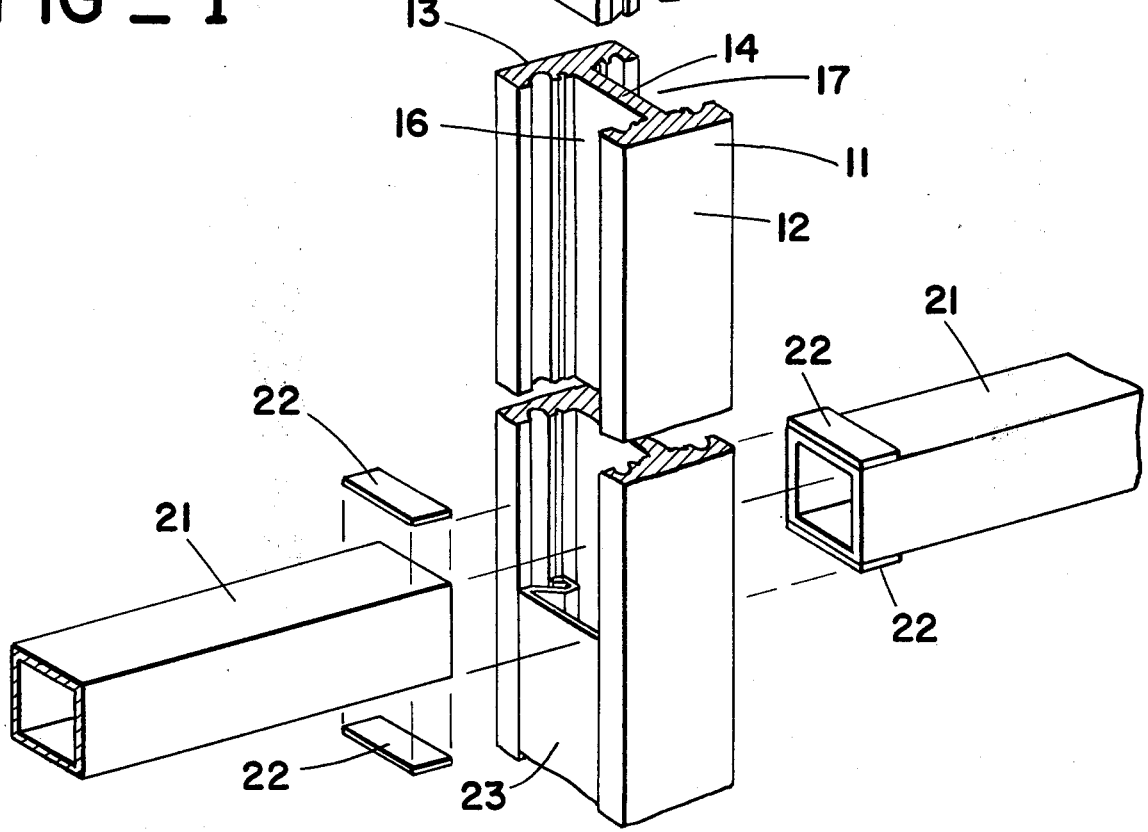
FIG _ 1

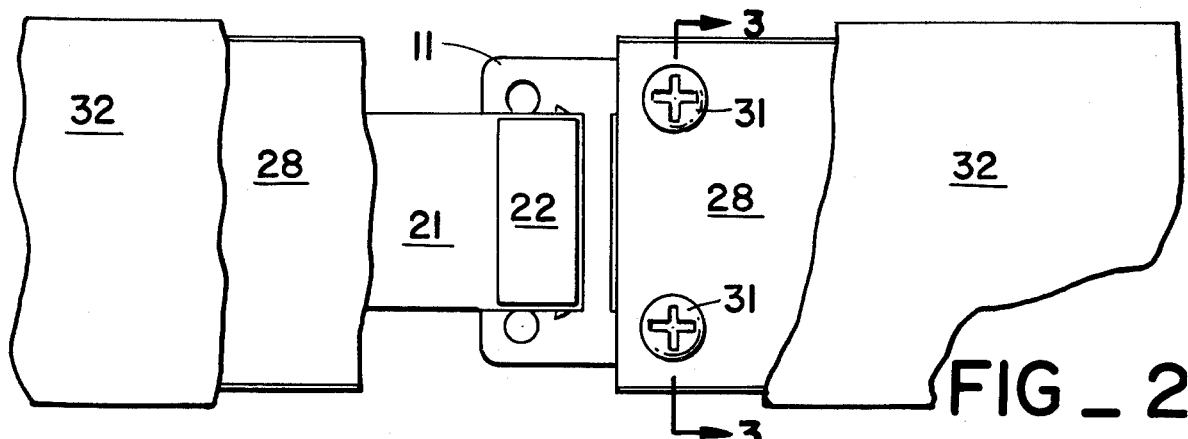
FIG_2
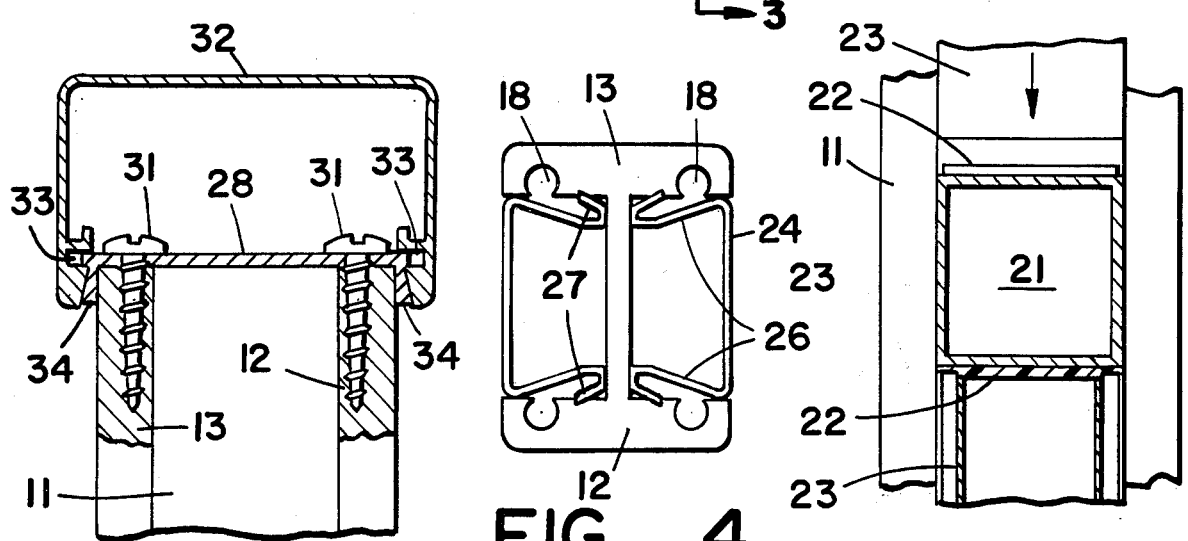
FIG_3   FIG_4   FIG_5
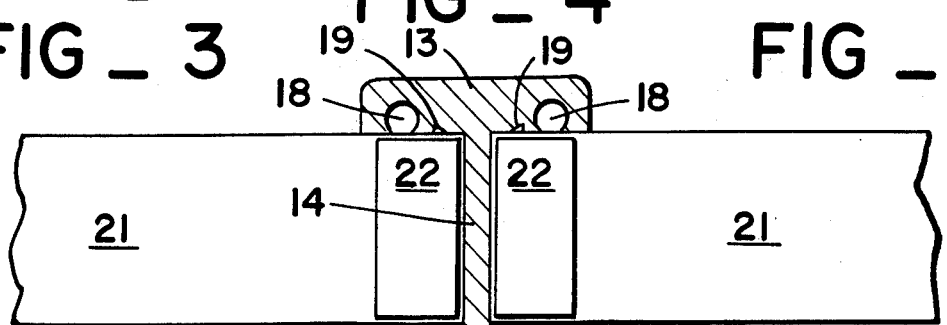
FIG_6
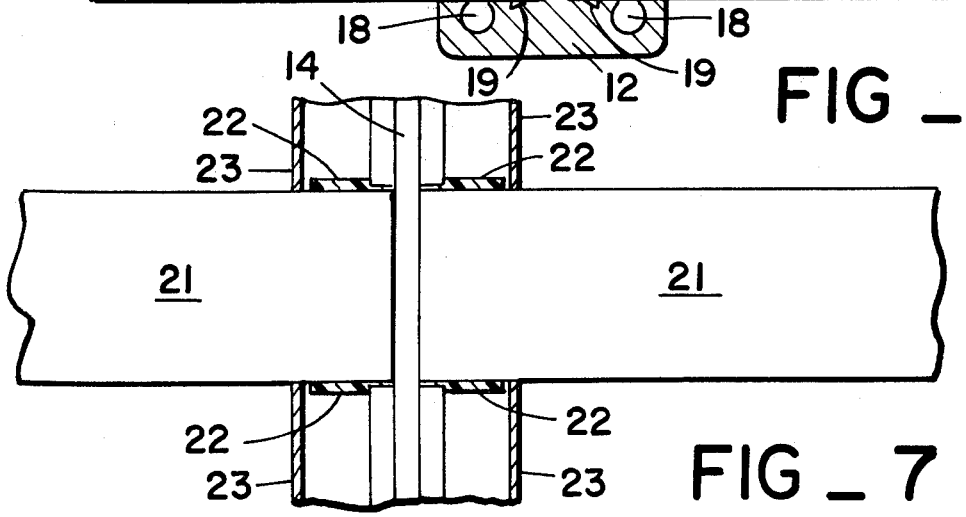
FIG_7

LINE RAIL CONSTRUCTION

BACKGROUND OF THE INVENTION

Horizontal bar railings are usually assembled at the site of installation by one of two methods. Either the railing members are assembled and bolted together, or the railing members are laid out and welded together. Both of these methods have significant drawbacks.

The bolting method of installation requires a great amount of manual labor to assemble the railing members, and is therefor costly. Further, the shear force from crowd impact, etc., imparted to the horizontal bars is usually borne only by the bolts received in the line posts, which sometimes prove to be insufficient for the task. Furthermore, mechanical assemblies tend to lossen with age and to rattle.

Welding is structurally more advantageous as an assembly method, but again it is costly in labor and energy. Also, an all-welded construction is often unable to accommodate thermal expansion and contraction, making it unsuitable for many types of applications.

SUMMARY OF THE INVENTION

The present invention is directed toward a construction for line post railings using horizontal bars between the line posts. The construction distributes any shear force applied to the horizontal bars directly to the line posts, and is designed to prevent any rattling of the railing members. Further, the assembly is simplified in that each horizontal bar is not individually and manually bolted to the line posts. Rather, the construction reduces the labor involved by relying on the compressive force of two screws to maintain the assembly tightly and securely together.

The rail construction includes a plurality of line posts with horizontal bars secured therebetween. Each line post is formed of a pair of vertical plate members spaced apart by a web member to define an H configuration having two oppositely opening vertical channels in which the ends of the horizontal bars are received. Each channel includes two pair of opposed grooves extending vertically in the interior surface of the post plates. One pair of grooves are arcuate in cross-section, and are adapted to receive self-tapping screws in the ends of the post. The other pair of grooves are adapted to retain the flanges of post inserts which are inserted in the channel to space apart the horizontal bars.

Double-sided foam tape is applied to the upper and lower surfaces of the end portions of the horizontal bars which are disposed within the channels of adjacent posts. The foam tape applies a resilient expansive force to the stack of horizontal bars and post inserts which are assembled in a channel.

Adjacent posts are assembled by means of a sub rail which is secured to each post be two self-tapping screws received in the upper portions of the arcuate grooves. As the screws are tightened down, the sub rail compresses the bar and insert assembly in the channels of that post, the compression opposing the countervailing force of the foam tape. The dynamic balance of these forces permits the assembly to accommodate thermal expansion without warping and without loosening and rattling.

THE DRAWING

FIG. 1 is an exploded view of the rail construction of the present invention.

FIG. 2 is a partially cutaway top view of a line post assembly of the rail construction of the present invention.

FIG. 3 is a vertical cross-sectional view of the sub rail-line post assembly, taken along line 3—3 of FIG. 2.

FIG. 4 is a horizontal cross-sectional view of a line post assembled with the line post inserts.

FIG. 5 is a vertical cross-sectional view of a line post receiving a horizontal bar and post insert assembly.

FIG. 6 is a horizontal cross-sectional view of a line post assembled with horizontal bars and post inserts.

FIG. 7 is a vertical cross-sectional view of a line post and horizontal bar assembly.

DESCRIPTION OF THE PREFERRED EMBODIMENT

With reference to FIG. 1 the rail construction of the present invention generally includes a plurality of line posts 11 secured in spaced apart relationship to a floor surface, steps, or the like. Each line post is formed of a pair of vertically extending plates 12 and 13 joined at their midpoints by a transverse web member 14 to define an H member having two oppositely opening channels 16 and 17. The channels 16 and 17 are identical.

Each of the channels 16 and 17 are provided with a pair of grooves 18 which are arcuate in cross-section, and which are disposed in opposed relationship in the interior surfaces of the plates 12 and 13 as shown in FIG. 4 and FIG. 6. Each channel is also provided with another pair of grooves 19, each parallel and adjacent to one of the grooves 18. Each groove 19 is formed by two vertically extending surfaces, the outer one being parallel to the web 14 and the inner one extending obliquely outwardly into the plate 13 or 12.

The railing construction also includes at least one railing bar 21 extending between adjacent line posts. Each railing bar 21 comprises a length of hollow rectangular tubing, as shown in FIGS. 1, 5 and 7, although round or solid tubing may also be employed. The ends of the railing bars 21 are disposed within the channels 16 and 17 of the line posts, with minimum clearance for easy fit. Double-sided adhesive foam tape pads 22 are secured to the bar portions which extend into the channels. It may be appreciated that the engagement of the bars 21 in the channels provides lateral support for the bars but no vertical support.

Vertical support for the railing bars is provided by a plurality of post inserts 23 disposed within the channels, as shown in FIGS. 1, 4, 5, and 7. These post inserts extend between the base of the line posts and the lower surface of the lowest railing bar, between the plurality of railing bars secured between the line posts, and from the top surface of the uppermost railing bar to the top of the line posts. The post inserts thus space apart and support the railing bars.

The post inserts are segments of a channel member formed of a planar web 24 (FIG. 4), and a pair of planar legs 26 extending obliquely inwardly from the opposed edges of the web. The distal ends of the legs are bent outwardly generally perpendicular to the web 24, and obliquely outwardly retro-extending flanges 27 are formed at the very ends of the legs 26. The post inserts are dimensioned so that the flanges resiliently engage the grooves 19 in self-retaining fashion, yet the inserts are free to slide in the channel in the vertical direction.

It should be noted that the post inserts actually impinge on the foam tape pads which are secured to the railing bars 21. In assembling a stack of post inserts and railing bars in a given channel of a line post, there is insufficient allowance made for the full thickness of the two or more foam pads which are included in the stack. Since the post inserts and the railing bars are dimensioned exactly so that the stack height equals the height of the post, the presence of the foam pads will cause the stack of inserts and railing bars to extend above the top of the line post.

As shown in FIGS. 1-3, a sub rail 28 is secured to the top surface of adjacent line posts, each sub rail including holes 29 which align with the upper openings of the grooves 18. Screws 31 are passed through the holes 29 and secured in the threaded upper portions of the grooves 18. Before the sub rail abuts the top of the line post it impinges on the stack of post inserts and railing bars extending above the top of the post. As the screws are tightened further (FIG. 5) the stack is compressed, the foam pads compressing elastically to permit the sub rail to be secured flush with the top of the line post.

The dynamic balance of the screw force acting against the resilient force of the foam pads provides a rattle-free construction for the railing. Furthermore, thermal expansion and contraction is easily accommodated by the resilient nature of the foam pads, which retains its resiliency during long periods of compression.

It should be noted that the two screws required to assemble a sub rail to a line post do not bear any of the lateral load imparted to the sub rail or the railing bars, nor any of the vertical load imparted to these members. The sub rail includes flanges 34 extending from opposed sides thereof which embrace the line post and bear any lateral load. The top rail 32 includes a pair of grooves 33 in the opposed sides thereof which resiliently engage the edges of the web of the sub rail to finish the rail assembly. The screws 31 will thus be covered by the top rail so that the construction will be permanent and tamper-proof.

It should be noted that any number of railing bars may be assembled in a stack in one channel of a line post, subject only to the limitation of the height of the post, yet only two screws 31 will assemble the stack. Thus much labor will be saved over prior art forms of railing construction, and the railing of the present invention will be structurally superior to any prior art constructions.

I claim:

1. A railing construction, comprising a plurality of line posts, each of said posts including a pair of channels disposed longitudinally therein, at least one railing bar secured with its ends disposed in opposed channels of adjacent line posts, a plurality of post inserts disposed within said channels for supporting and spacing said railing bars, means for securing said post inserts within said channels in the lateral direction, means for securing said post inserts and said railing bars in said channels in the longitudinal direction, and a plurality of resilient pads, each secured to the upper or lower surface of the portion of said railing bars extending into said channels of said line posts.

2. The railing construction of claim 1, wherein said post inserts and said railing bars are assembled in successive stack fashion in said channels to a height greater than the height of said line posts.

3. The railing construction of claim 2, wherein said last mentioned means includes means for compressing said assembled stack to a height equal to the height of said line posts.

4. The railing construction of claim 3, wherein said means for compressing said assembled stack includes a sub rail joined in flush relationship to the top of said line posts, and screw means for securing said sub rail to said top of said line posts.

5. The railing construction of claim 1, wherein said means for securing said post inserts within said channels includes a first pair of grooves disposed in the opposed sides of each of said channels, said post inserts including means for cooperatively and resiliently engaging said first pair of grooves to retain said post inserts within said channel.

6. The railing construction of claim 1, wherein said last mentioned means includes a sub rail secured to the top of said line posts, and screw means for joining said sub rail to said top of said line posts.

7. The railing construction of claim 6, further including a top rail snappingly secured to said sub rail and covering said screw means.

* * * * *